(12) United States Patent
Takeshita et al.

(10) Patent No.: US 8,175,455 B2
(45) Date of Patent: May 8, 2012

(54) OPTICAL TRANSMISSION SYSTEM AND OPTICAL TRANSMISSION CONTROL METHOD

(75) Inventors: Hitoshi Takeshita, Tokyo (JP); Toshiharu Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 410 days.

(21) Appl. No.: 12/442,559

(22) PCT Filed: Oct. 4, 2007

(86) PCT No.: PCT/JP2007/069471
§ 371 (c)(1),
(2), (4) Date: Mar. 24, 2009

(87) PCT Pub. No.: WO2008/044595
PCT Pub. Date: Apr. 17, 2008

(65) Prior Publication Data
US 2010/0021169 A1 Jan. 28, 2010

(30) Foreign Application Priority Data
Oct. 11, 2006 (JP) .................................. 2006-277053

(51) Int. Cl.
*H04B 10/08* (2006.01)
(52) U.S. Cl. .................. 398/29; 398/28; 398/81; 398/5
(58) Field of Classification Search .................. 398/29, 398/28, 81, 5
See application file for complete search history.

(56) References Cited

U.S. PATENT DOCUMENTS

| | | | |
|---|---|---|---|
| 7,035,548 B2* | 4/2006 | Ooi et al. | 398/159 |
| 2001/0008452 A1* | 7/2001 | Sugihara et al. | 359/124 |

FOREIGN PATENT DOCUMENTS

| | | |
|---|---|---|
| JP | 1994334606 A | 12/1994 |
| JP | 8-125636 A | 5/1996 |
| JP | 2001505668 A | 4/2001 |
| JP | 2004242320 A | 8/2004 |
| JP | 2005045379 A | 2/2005 |
| JP | 2005348322 A | 12/2005 |

OTHER PUBLICATIONS

International Search Report for PCT/JP2007/069471 mailed Nov. 20, 2007.
Japanese Office Action for JP2008-538688 issued Feb. 21, 2012.

* cited by examiner

*Primary Examiner* — Kinam Park

(57) ABSTRACT

The present invention is intended to provide an optical transmission system which is applicable not only to a known signal but also to an unknown signal, and has a high reliability at a low cost. A branching device branches an optical transmission output of a transmitter, and transmits the branched signals through different optical transmission channels. A polarization mode dispersion monitor monitors the degree of polarization mode dispersion from the optical transmission channels at the receiving end. A switch control circuit and a switch select a signal which is less affected by a deterioration in quality due to polarization mode dispersion, and outputs the selected signal to receiver 8. In this way, the probability of a deterioration in the quality of a signal due to polarization mode dispersion can be reduced for a transmission signal.

16 Claims, 3 Drawing Sheets

OPTICAL TRANSMISSION SYSTEM AND OPTICAL TRANSMISSION CONTROL METHOD

This application is the National Phase of PCT/JP2007/069471, filed Oct. 4, 2007, which is based upon and claims the priority under Japanese Patent Application No. 2006-277053 filed Oct. 11, 2006, the disclosure of which is herein incorporated by reference in its entirety.

TECHNICAL FIELD

The present invention relates to an optical transmission system and an optical transmission control method, and more particularly, to an optical transmission system which reduces the probability of failures caused by polarization mode dispersion.

BACKGROUND ART

In an optical transmission system, when signals are transmitted at higher rates on the order of several tens of Gbps, quality deterioration due to polarization mode dispersion becomes non-negligible. As the influence of polarization mode dispersion increases, signals cannot be normally transmitted/received in some cases. Approaches that are generally used to reduce the influence of polarization mode dispersion include devising a transmission signal modulation scheme, utilizing a transmission channel which is less affected by polarization mode dispersion, and compensating for waveform for distortion.

One method of devising a transmission signal modulation scheme is to use multi-value modulation. A transmission bit rate can be represented by the product of the number of codes per bit and a transmission rate. Generally, the number of codes per bit is one in optical transmissions, but the same bit rate can be achieved at a lower transmission rate by increasing the number of codes.

Since the influence of polarization mode dispersion increases in proportion to the transmission rate, the influence of the polarization mode dispersion can be reduced by increasing the number of codes per bit, i.e., using a multi-value modulation. However, in most cases, the realization of a multi-value optical modulation such as QPSK (Quadrature Phase Shift Keying) is accompanied by a high cost, an increase in the size of device, and technical difficulties. Therefore, utilization of optical multi-value modulation gives rise to problems in terms of the cost, size, and the degree of technical difficulty.

While deterioration in the quality of transmission signals caused by the polarization mode dispersion is mitigated by utilizing a transmission channel which is less affected by polarization mode dispersion, replacement of a transmission channel involves a large scale construction work, and may lead to a situation where the provision of services can not but be interrupted in some cases. Thus, problems arise in terms of cost and availability.

There is also a method of preventing a deterioration of the quality of transmission signals by correcting waveform distortion to equalize a waveform distorted by polarization mode dispersion. This method depends on which information is used as a basis to control an equalizer. At present, no method is available for correctly monitoring the amount of polarization mode dispersion, including up to higher order components, in service, so that direct control cannot be conducted on the basis of the amount of polarization mode dispersion. Since a monotonously increasing correlation exists between the magnitude of polarization mode dispersion and the bit error rate (BER) of a received signal, indirect control can be conducted on the basis of BER.

However, since factors causing a BER deterioration are not limited to polarization mode dispersion, it is necessary to extract the deterioration caused by the polarization mode dispersion from a BER deterioration amount, but such a method is not available at present. In other words, correct polarization mode dispersion equalization control cannot be conducted with the use of BER information. Accordingly, a waveform equalization scheme implies technical difficulties at present.

Also, any of the conventional techniques described above is limited in the amount of improvements in polarization mode dispersion immunity, and the amount of improvements is not often proportionate to the cost. A preferable method for providing improvement is one in which improvement, though is not necessarily the highest degree of improvement, can be obtained at a cost that is only half as expensive as a method which obtained the highest amount of improvements attainable using state of the art techniques.

Referring now to Patent Document 1, a technique is disclosed for branching a transmitted optical signal into two lines and selecting a signal on a line which shows smaller polarization mode dispersion, in order to mitigate the influence of polarization mode dispersion which occurs within an optical fiber.

Patent Document 1: JP-6-334606

DISCLOSURE OF THE INVENTION

Problems to be Solved by the Invention

In the technique of Patent Document 1 mentioned above, for selecting a signal on a line which shows smaller polarization mode dispersion, a reference signal generator is provided at a receiving end to compare this reference signal with a reception signal on each line, and a signal on a line closer to the reference signal is regarded as a signal which suffers from a smaller degree of polarization mode dispersion, and is therefore selected.

In this technique of Patent Document 1, a reference signal generator is required because the reference signal is used to select a signal which suffers from a smaller degree of polarization mode dispersion. Also, for generating this reference signal, a signal to be transmitted must be known, so that this technique is disadvantageous in that it cannot be applied to an unknown signal.

The present invention has been made in view of the problems encountered by the conventional techniques as described above, and it is an object of the invention to provide an optical transmission system and an optical transmission control method which can be applied not only to a known signal but also to an unknown signal, and which are highly reliable and have a low cost.

Means for Solving the Problem

An optical transmission system according to the present invention is characterized by comprising means for branching an optical transmission output into a plurality of optical branch signals, optical transmission paths different from one another for transmitting these optical branch signals, monitoring means for monitoring the respective optical signals passing through the optical transmission paths to determine the degree of polarization mode dispersion state, respectively, and control means for selecting and controlling an optical signal passing through the optical transmission path based on deterioration in quality due to polarization mode dispersion which the monitoring results reveal.

An optical transmission control method according to the present invention is characterized by comprising a step of branching an optical transmission output into a plurality of optical branch signals, and transmitting these optical branch signals that pass through optical transmission paths that are different from one another, a monitoring step for monitoring the respective optical signals passing through the optical transmission paths to determine the degree of polarization mode dispersion state, respectively, and a control step of selecting and controlling an optical signal through the optical transmission path based on deterioration in quality due to polarization mode dispersion which the monitoring results reveal.

A first effect provided by the present invention is to have a high reliability. This is justified by the fact that the probability of occurrence of transmission/reception error can be reduced by selecting a transmission channel which exhibits good quality from a plurality of optical transmission channels to perform transmission/reception, whereby even if the signal quality deteriorates on one transmission channel, this channel is switched to another transmission channel, on which the signal quality deteriorates to a lower degree, to perform transmission/reception.

A second effect provided by the present invention is high availability of service. The reason for this is that services need not be stopped even when a transmission channel is switched to another one because the switching can be made without instantaneous interruption by performing buffering in a reception unit.

A third effect provided by the present invention is the ability to reduce the introduction cost. The reason for this is that an optical signal source can be shared even if a plurality of optical transmission channels are used, so that the optical signal source need not be provided for each optical transmission channel. Also, another reason why the present invention can reduce introduction cost is that previously installed transmission channels and optical transceivers can be utilized.

A fourth effect provided by the present invention is the ability to reduce the operation costs. The basis for this effect is that the work effect required to investigations causes and to execute repairs in the event of a failure can be reduced, and this results from the fact that a system failure can be distinguished from a transmission/reception error caused by polarization mode dispersion which is a temporary failure due to an environmental change.

A fifth effect provided by the present invention is simple control. The reason for this is that polarization mode dispersion immunity can be increased simply by using a transmission channel switching control without using complicated waveform equalization techniques or signal compensation techniques.

A sixth effect provided by the present invention is simple system construction. The reason for this is that previously installed transmission channels and optical transceivers can be utilized without the need for newly installing new transmission channels or optical transceivers for the present invention, i.e., a previously designed system can be utilized without requiring a new system design.

A seventh effect provided by the present invention is the ability to sufficiently support not only a known signal but also an unknown signal. The reason for this is that a device for monitoring the degree of polarization is used in selecting a signal on a line which is less affected by polarization mode dispersion, without relying on a comparison with a reference signal.

DESCRIPTION OF REFERENCE NUMERALS

1 Transmitter
2, 23 Branching Devices
4, 3, 24, 25, 49, 50 Optical Transmission Channels
5, 6 Buffers
7, 30, 57 Switches
8, 31, 53, 54 Receivers
9 Polarization Mode Dispersion Monitor Device
10, 33 Switch Control Circuit
21, 45 Signal Sources
22 E/O (Electro-optical) converter
26, 2751, 52, O/E converter
28, 29, 55, 56 FIFO buffers
32 Polarization Degree Monitor Device
321, 322 Polarization Degree Meters
323 Interface
331 CPU
332 Memory
41, 43 Semiconductor Lasers
42, 44 Optical Modulators
46 Combiner
47 Wavelength Multiplex Optical Transmission Channel
48 Combiner
1000 Optical Transmission Channel Selector

BEST MODE FOR CARRYING OUT THE INVENTION

Figure 1:
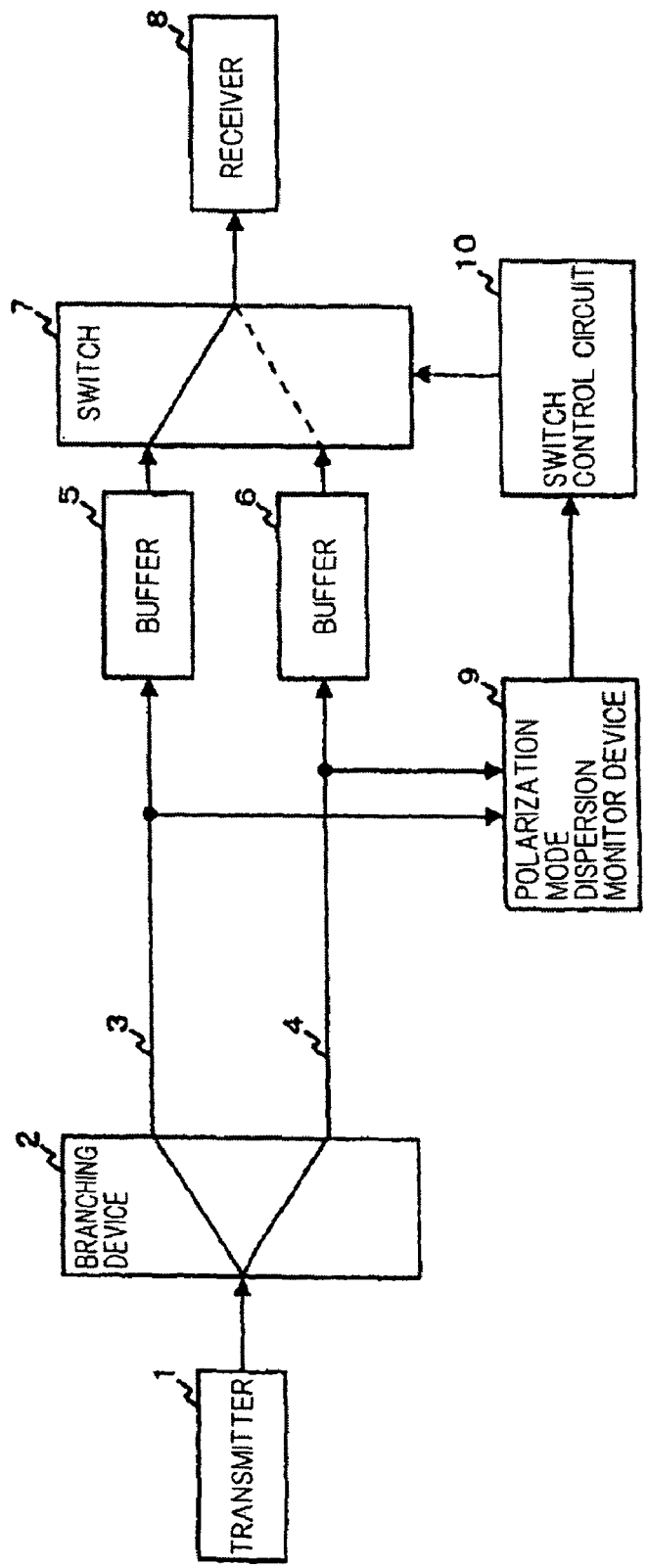
FIG. 1 A system block diagram of an embodiment of the present invention.

In the following, an embodiment of the present invention will be described with reference to the drawings. FIG. 1 is a general functional block diagram of an embodiment of the present invention.

In FIG. 1, an optical signal output from transmitter 1 is branched by branching device 2. The branched optical signals are led to optical transmission channels 3, 4, respectively. Then, each of these optical signals is input to switch 7 through reception buffer 5, 6, respectively.

Only one of the input optical signals is selected by switch 7, and is led to receiver 8. A switching control for switch 7 is implemented by switch control circuit 10. In this switch control circuit 10, the switching timing is determined from the result of monitoring polarization mode dispersion by polarization mode dispersion monitor device 9.

In the following, the operation of an optical signal quality monitoring device configured as described above will be described with reference to FIG. 1.

In FIG. 1, an optical signal output from transmitter 1 is branched by branching device 2, and the branched optical signals are led to optical transmission channels 3, 4, respectively. The two branched signals are equivalent signals except that they are on different transmission channels, and only one of the optical signals after transmission is selected by switch 7 after they have passed through reception buffers 5, 6, respectively.

In this event, control as to which signal is selected is conducted by switch control circuit 10. The signal selected by switch 7 is led to receiver 8. In this way, a signal transmission is performed between transmitter 1 and receiver 8. In switch control circuit 10, the switching timing is determined from the result of monitoring by polarization mode dispersion monitor device 9.

Parts of optical signals from transmission channels 3, 4 are extracted by branching, and input to polarization mode dispersion monitor device 9, such that the transmission channels can be monitored for the polarization states in real time. Switch control circuit 10 can know, from the polarization mode dispersion monitoring result, which of transmission channels 3, 4 shows a smaller degree of polarization mode dispersion.

Also, by previously defining a switching threshold associated with polarization mode dispersion, instructions can be issued to switch 7 to switch to the other transmission channel when polarization mode dispersion of a selected transmission channel exceeds the switching threshold, or not to switch when polarization mode dispersion is equal to or more than the threshold on both channels.

The occurrence probability of a transmission error is reduced by the value of N square having a synergetic effect that result from using two transmission channels. While an instantaneous signal interruption occurs at an instance at which one transmission channel is switched to the other by switch 7, instantaneous signal interruption can be prevented at the time of switching by storing a certain amount of transmission information in reception buffers 5, 6.

<Exemplary Implementation 1>

Figure 2:
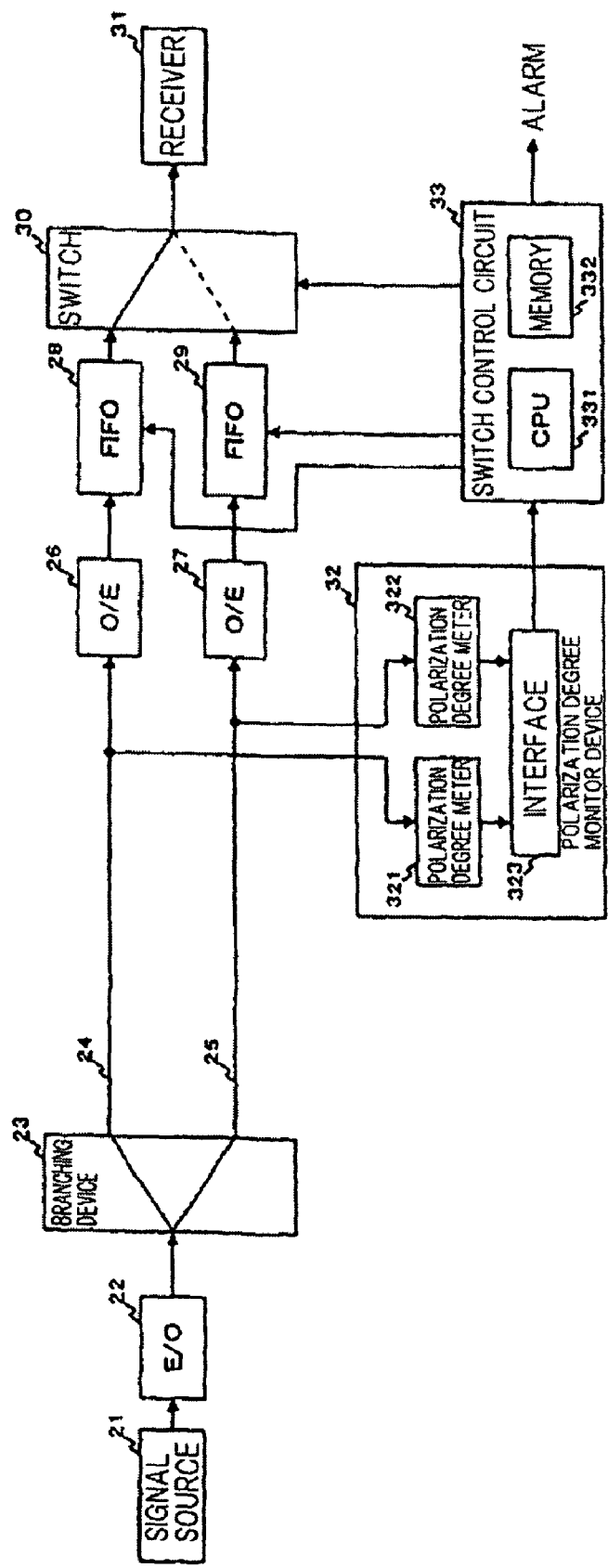
FIG. 2 A system block diagram of one exemplary implementation of the present invention.

In the following, a specific exemplary implementation of the present invention will be described with reference to FIG. 2. FIG. 2 shows an exemplary implementation which employs polarization degree monitor device 32 for polarization mode dispersion monitor device 9 in FIG. 1, and FIFO (First-In First-Out) type electric buffers 28, 29 for the buffers in the reception unit.

In FIG. 2, a transmission electric signal generated from signal source 21 is electro-optically converted by electro-optical converter (E/O converter) 22, 1:2 splitter 23 is used as the branching device, and optical transmission is performed on two spatially multiplexed optical transmission channels 24, 25.

Optical signals after transmission are opto-electrically converted by opto-electric converters (O/E converters) 26, 27, respectively, and input to FIFO type electric buffers 28, 29.

Buffers 28, 29 can always store signals which are transmitted at a time which exceeds the switching time of switch 30 having two-input, one-output. Transmission signals which have passed through buffers 28, 29 are input to electric switch 30.

Electric switch 30 selects either the output of O/E converter 26 or the output of O/E converter 27 in response to instructions from switch control circuit 33, and leads the selected output to receiver 31.

Polarization degree monitor device 32 is applied with parts of transmission optical signals from two optical transmission channels 24, 25. Polarization degree monitor device 32 is provided therein with polarization degree meters 321, 322. A polarization degree monitoring result is sent to switch control circuit 33 through external interface circuit 323.

Switch control circuit 33 is provided therein with CPU 331 and memory 332. A polarization degree threshold has been previously set in memory 332 for switching switch 30. CPU 331 determines a switching timing for switch 30 using this switching threshold and a polarization degree monitoring result, and gives instructions for switching.

Next, a description will be given of the operation of the optical transmission system in FIG. 2. In FIG. 2, a transmission electric signal generated from signal source 21 is electro-optically converted by E/O converter 22, and the resulting optical signal is branched into two by one-input, two output splitter 23. The branched optical signals are transmitted through two optical transmission channels 24, 25 to perform an optical transmission. The two branched signals are equivalent transmission optical signals except that they are on different transmission channels.

After transmission the optical signals are opto-electrically converted by O/E converters 26, 27, led to buffers 28, 29, respectively, and input to electric switch 30. Electric switch 30 selects either the output of buffer 28 or the output of buffer 29 in response to instructions from switch control circuit 33, and inputs the selected output to receiver 31. In this way, the signal is received.

Buffers 28, 29 are configured to always buffer the amount of signals that are transmitted for at least the period during which electric switch 30 is switched or longer. Switch control circuit 33 records switch switching start time t1 and end time t2. When optical transmission channel 24 is switched to optical transmission channel 25, only output data of buffer 28 is enabled by switch control circuit 33, whereas output data of buffer 29 is disabled.

Then, between times t1 and t2, neither of optical transmission channels 24, 25 is connected to receiver 31. However, transmission data is stored in buffer 29 between times t1 and t2, and switch control circuit 33 gives instructions to disable the output of buffer 28 and enable the output of buffer 29 from time t1, whereby signals are apparently sent to receiver 31 as if it were connected by the switching without instantaneous interruption.

In this way, it is possible to absorb the propagation time difference caused by the difference in transmission length between two transmission channels 24, 25, and to prevent an instantaneous signal interruption which may occur at the time when switch 30 performs a switching operation. Thus, receiver 31 can receive signals without instantaneous interruption, without giving rise to reception errors, even if switch 30 switches one transmission channel to another.

Polarization degree monitor device 32 is applied with parts of transmission optical signals from two optical transmission channels 24, 25. Polarization degree monitor device 32 is provided therein with polarization degree meters 321, 322 to measure the degree of polarization of optical transmission channels 24, 25, respectively. These measuring results are sent to switch control circuit 33 through external interface circuit 323.

Switch control circuit 33 is provided therein with CPU 331 and memory 332. A polarization degree threshold has been previously set in memory 332 for switching switch 30. CPU 31 compares the switching threshold with the polarization degree monitoring results input from polarization degree monitor device 32, and issues to switch 30 such instructions as to switch when any of the polarization degree monitoring results exceeds the threshold, or to maintain the present state without switching.

Generally, polarization mode dispersion fluctuates over time, and the magnitude and duration of fluctuations are random and unpredictable. Thus, the polarization mode dispersion can abruptly repeat changes for a short time, or slowly change over a long time. Also, the convergence of changes may result in returning to the same amount of polarization mode dispersion as that before the changes, or increasing or decreasing the amount of polarization mode dispersion. This is caused by a change in environmental temperature around optical transmission channels 24, 25 and a change in pressure applied to the same.

If large pressure is instantaneously applied for some reason, the amount of polarization mode dispersion instantaneously increases or decreases and again returns to the original amount. When the environmental temperature changes, the amount of polarization mode dispersion increases or decreases over a long time. Further, due to wavelength dependence, the amount of signal deterioration caused by polarization mode dispersion varies depending on the transmission optical signal wavelength even if the same environmental change occurs. Therefore, when the degree of polarization of optical transmission channel 24 increases to the threshold or more, the degree of polarization of optical transmission channel 25 can simultaneously increase to the threshold or more as well.

Accordingly, switching instructions are issued when the degree of polarization of optical transmission channel 24 is equal to or more than the polarization degree threshold, and the degree of polarization of optical transmission channel 25 is equal to or less than the polarization degree threshold, while no switching instructions are issued when both channels show a degree of polarization equal to or more than the threshold, thus maintaining the present state. In such an event, even the switching would not potentially improve deterioration in the quality of signals caused by polarization mode dispersion. In another sense, the probability of defective operations is reduced by not performing surplus operations.

However, since fluctuation in polarization mode dispersion is a random event, it seems that two optical transmission channels would simultaneously show amounts of polarization mode dispersion that are equal to or more than the threshold with a low probability. Accordingly, by using two optical transmission channels, the probability of the occurrence of transmission failure is reduced to parts by a square as compared with the case of one channel, from a synergetic effect, thus making it possible to reduce the transmission failure occurrence probability.

Though not particularly shown, switch control circuit 33 is provided with a switching protection timer. This timer may be provided within CPU 331. This timer causes switching instructions to be issued to switch 30 at the time the switching threshold has been exceeded for a certain period or longer. This prevents switch 30 from frequently switching at short time intervals (chattering). The transmission channel is switched by switch 30 when the polarization mode dispersion continuously remains at a certain threshold or more. In this regard, assume that the switching threshold defined for switch control circuit 33 is defined to dictate more strict conditions than those under which a signal failure (SF) occurs in receiver 31.

While signal deterioration due to polarization mode dispersion is one cause for introducing SF, there are a variety of causes such as OSNR (Optical Signal Noise Ratio) deterioration and the like. When deterioration is caused by a factor other than polarization mode dispersion, the deterioration continues to occur once it arises, whereas signals may sometimes instantaneously recover from a deterioration caused by polarization mode dispersion. This is because deterioration due to a cause other than polarization mode dispersion is attributable to a failure in a transmitter or to an erroneous connection, whereas deterioration due to polarization mode dispersion is attributable to a change in the state of the transmission channel, rather than a system failure.

By setting the switching threshold defined for switch control circuit 33 to be stricter than the SF condition, deterioration caused by polarization mode dispersion will be removed when SF occurs, so that it is possible to identify whether the deterioration is caused by a system failure or by a change in the state of the transmission channel due to polarization mode dispersion, thus providing a data for determining whether or not a device must be repaired.

From the foregoing, receiver 31 can transmit/receive signals which are less affected by polarization mode dispersion. Since there is a monotonously increasing correlation between the degree of polarization and polarization mode dispersion, and since there is a one-to-one correlation between the degree of polarization and a code error ratio, it is possible to implement a transmission system which is capable of reducing the probability of reducing the code error ratio due to polarization mode dispersion by maintaining the degree of polarization at a certain level or lower at all times.

While the foregoing description has been made in connection with an example in which a transmission optical signal is branched into two, the number of branches can be determined to be an arbitrary number equal to or more than two. Also, while a polarization mode dispersion monitoring scheme has been described in connection with an example in which polarization degree meters are utilized, another scheme may also be used.

<Second Exemplary Implementation>

Figure 3:
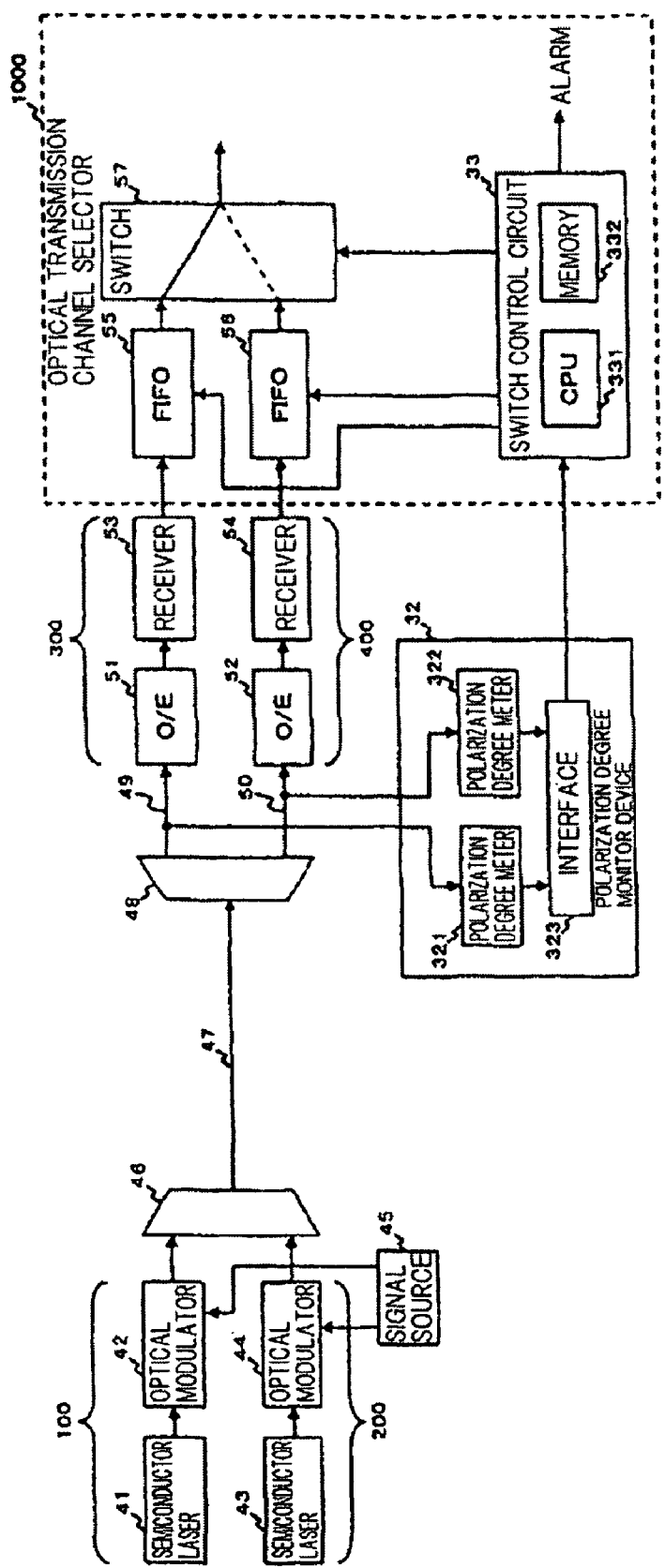
FIG. 3 A system block diagram of another exemplary implementation of the present invention

FIG. 3 is a functional block diagram of another exemplary implementation of the present invention, which is an example of utilizing wavelength multiplexed optical signals as optical transmission channels different from one another, with respect to an optical transmission system. In this regard, parts equivalent to those of FIG. 2 are designated by the same reference numerals.

Referring to FIG. 3, CW (Continuous Wave) light emitted from semiconductor lasers 41, 42 which oscillate at wavelengths different from each other is input to optical modulators 42, 43, respectively. Here, assume that semiconductor laser 41 oscillates at wavelength λ 1, and semiconductor laser 42 oscillates at wavelength λ 2. Optical modulators 42, 43 modulate CW input by an electrically modulated signal from signal source 45 according to light intensity. Outputs of these optical modulators 42, 43 are wavelength multiplexed by combiner 46, and then transmitted through optical transmission channel 47.

A signal transmitted through this optical transmission channel 47 is separated into optical signals on a wavelength-by-wavelength basis by wavelength separator 48, and an optical signal at wavelength λ 1 is transmitted to optical transmission channel 49, while an optical signal at wavelength λ 2 is transmitted to optical transmission channel 50, respectively. The optical signals after transmission are opto-electrically converted by opto-electric converters (O/E converters) 51, 52, and received by optical receivers 53, 54, respectively, and then input to FIFO buffers 55, 56 and input to electric 2:1 switch 57. Electric switch 57 selects either the output of buffer 55 or the output of buffer 56 in response to an instruction from switch control circuit 33.

Polarization degree monitor device 32 is applied with parts of the transmission optical signals from two optical transmission channels 49, 50. Polarization degree monitor device 32 is provided therein with polarization degree meters 321, 322. Polarization degree monitoring results are sent to switch control circuit 33 through external interface circuit 323. Switch control circuit 33 is provided therein with CPU 331 and memory 332. A polarization degree threshold has been previously set in memory 332 for switching switch 57. CPU 331 determines the timing for switching switch 57, using this switching threshold and the polarization degree monitoring result, and gives instructions for the switch to be switched.

The optical signals at wavelength λ 1 and at wavelength λ 2 transmitted through optical transmission channels 49, 50, respectively, are completely the same as data, but are separate optical signals which differ in wavelength. Since the polarization mode dispersion exhibits wavelength dependence, the amount of polarization mode dispersion is different at a different wavelength. Therefore, these wavelengths are preferably selected such that the difference between their wavelengths is as large as possible.

When the polarization mode dispersion of the optical signal at wavelength λ 1 increases to the switching threshold set in switch control circuit 33 or more, signal deterioration due to polarization mode dispersion can be restrained by switching the optical signal at wavelength λ 1 to the optical signal at wavelength λ 2 which is subjected to a smaller amount of polarization mode dispersion Also, this exemplary implementation is advantageous in that there is no difference in transmission delay due to different paths because the optical signals at wavelength λ 1 and wavelength λ 2 are transmitted through optical transmission channel 47, and is also advantageous in that the capacity of buffers 55, 56 of the reception unit can be reduced. Also, in this configuration, semiconductor laser 41 and optical modulator 42 can be regarded as optical transmitter 100 at wavelength λ 1, while semiconductor laser 43 and optical modulator 44 can be regarded as optical transmitter 200 at wavelength λ 2. In the reception unit, O/E converter 51 and receiver 53 can be regarded as optical receiver 300 at wavelength λ 1, while O/E converter 52 and receiver 54 can be regarded as optical receiver 400 at wavelength λ 2.

Accordingly, by adding optical transmission channel selector 1000 which comprises FIFO buffers 55, 56, switch 57, and switch control circuit 33 in an existing wavelength multiplex transmission system, an unused wavelength channel can be effectively utilized as an optical transmission channel for improving polarization mode dispersion immunity.

While the present invention has been described with reference to the embodiment (and exemplary implementations), the present invention is not limited to the embodiment (and exemplary implementations) described above. The present invention can be modified in configuration and details in a variety of manners which can be understood by those skilled in the art to be within the scope of the present invention.

This application claims the priority under Japanese Patent Application No. 2006-277053 filed Oct. 11, 2006, the disclosure of which is herein incorporated by reference in its entirety.

The invention claimed is:

1. An optical transmission system comprising:
a branch device which branches an optical transmission output into a plurality of optical branch signals, the optical branch signals transmitted through optical transmission paths that are different from one another;
a monitor device which monitors the respective optical signals passing through the optical transmission paths to determine the amount of polarization mode dispersion, respectively;
a switch control device which selects an optical signal passing through said optical transmission path based on the deterioration in quality of the signal due to polarization mode dispersion which the monitoring results reveal;
a switch device which receives the optical branch signals and outputs the optical signal selected by the switch control device; and
a receiver which receives the optical signal output by the switch device.

2. The optical transmission system according to claim 1, further comprising a buffer device which buffers the respective optical signals passing through said optical transmission paths, respectively, wherein said switch control device selects and controls a buffer output by using said buffering buffer device.

3. The optical transmission system according to claim 1, wherein said switch control device conducts the selection and control when the deterioration in the quality of the signal continues for a certain time.

4. The optical transmission system according to claim 1, wherein said monitor device comprises a polarization degree meter for monitoring each optical signal for the degree of polarization after said each optical signal has passed through said optical transmission path.

5. The optical transmission system according to claim 1, further comprising a transmission failure device that detects a transmission failure in said optical transmission paths, wherein a reference for detecting a transmission failure caused by a deterioration in quality due to polarization mode dispersion in said switch control device is set to be stricter than a transmission failure detection reference for detecting a transmission failure on said optical transmission paths by said transmission failure device.

6. The optical transmission system according to claim 1, wherein only said optical transmission paths are multiplexed into a plural number.

7. The optical transmission system according to claim 1, wherein said optical transmission paths comprise a spatially multiplexed optical fiber.

8. The optical transmission system according to claim 7, wherein said optical transmission output is a wavelength multiplexed optical signal, and each of said optical transmission paths is configured to transmit the optical signal at each wavelength of the wavelength multiplexed optical signal.

9. An optical transmission control method comprising:
a step of branching an optical transmission output into a plurality of optical branch signals, and transmitting the optical branch signals through optical transmission paths that are different from one another;
a monitoring step of monitoring the respective optical signals passing through said optical transmission paths to determine the amount of polarization mode dispersion, respectively;
a switch controlling step of selecting and controlling an optical signal passing through said optical transmission path based on the deterioration in quality of the signal due to polarization mode dispersion which the monitoring results reveal;
a switching step of receiving the optical branch signals and outputting the optical signal selected by the switch controlling step; and
a receiving step of receiving the optical signal output by the switching step.

10. The optical transmission control method according to claim 9, further comprising a buffer step of buffering the respective optical signals passing through said optical transmission paths in a buffer device, respectively, wherein said switch controlling step selects and controls a buffer output by said buffer device.

11. The optical transmission control method according to claim 9, wherein said switch controlling step includes a step of implementing the selection and control when deterioration in quality of a signal continues for a certain time.

12. The optical transmission control method according to claim 9, wherein said monitoring step monitors each optical signal for the degree of polarization after said each optical signal has passed through said optical transmission path.

13. The optical transmission control method according to claim 9, wherein a reference for detecting a transmission failure caused by a deterioration in the quality of the signal due to polarization mode dispersion at said switch controlling step is set to be stricter than a transmission failure detection reference for detecting a transmission failure on said optical transmission paths.

14. The optical transmission control method according to claim 9, wherein only said optical transmission paths are multiplexed into a plural number.

15. The optical transmission control method according to claim 9, wherein said optical transmission paths comprise a spatially multiplexed optical fiber.

16. The optical transmission control method according to claim 15, wherein said optical transmission output is a wavelength multiplexed optical signal, and each of said optical transmission paths is configured to transmit an optical signal at each wavelength of the wavelength multiplexed optical signal.

* * * * *